(12) United States Patent
Kito

(10) Patent No.: US 11,092,307 B2
(45) Date of Patent: Aug. 17, 2021

(54) VEHICLE LAMP

(71) Applicant: KOITO MANUFACTURING CO., LTD., Tokyo (JP)

(72) Inventor: Masanori Kito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/966,579

(22) PCT Filed: Feb. 7, 2019

(86) PCT No.: PCT/JP2019/004334
§ 371 (c)(1),
(2) Date: Jul. 31, 2020

(87) PCT Pub. No.: WO2019/159801
PCT Pub. Date: Aug. 22, 2019

(65) Prior Publication Data
US 2021/0048163 A1    Feb. 18, 2021

(30) Foreign Application Priority Data
Feb. 14, 2018 (JP) .............................. JP2018-024093

(51) Int. Cl.
*F21S 41/657*   (2018.01)
*F21S 41/63*    (2018.01)
*G02B 5/18*     (2006.01)

(52) U.S. Cl.
CPC .............. *F21S 41/657* (2018.01); *F21S 41/63* (2018.01); *G02B 5/18* (2013.01); *G02B 2005/1804* (2013.01)

(58) Field of Classification Search
CPC .......... F21S 41/657; F21S 41/63; G02B 5/18; G02B 2005/1804
See application file for complete search history.

(56) References Cited

U.S. PATENT DOCUMENTS
2017/0334341 A1    11/2017    Kurashige et al.

FOREIGN PATENT DOCUMENTS
| JP | 2005-301164 A | 10/2005 |
| JP | 2012-146621 A | 8/2012 |
| WO | 2008/081564 A1 | 7/2008 |
| WO | 2016/072505 A1 | 5/2016 |

OTHER PUBLICATIONS

Machine translation of JP 2005-301164A (Year: 2005).*
International Search Report of PCT/JP2019/004334 dated Apr. 16, 2019 [PCT/ISA/210].

* cited by examiner

*Primary Examiner* — Anne M Hines
(74) *Attorney, Agent, or Firm* — Sughrue Mion, PLLC (57) ABSTRACT

A vehicle headlamp (1) includes: a light source (52R, 52G, 52B) that emits light having a predetermined wavelength; a light distribution pattern forming optical system (56R, 56G, 56B) that includes a collimator lens (53R, 53G, 53B) and a diffraction grating (54R, 54G, 54B) that change a traveling direction of at least some of pieces of light emitted from the light source (52R, 52G, 52B), and emits light ($L_R$, $L_G$, $L_B$) having a predetermined light distribution pattern; and a vibration imparting unit (57R, 57G, 57B) that relatively vibrates the light source (52R, 52G, 52B) and the diffraction grating (54R, 54G, 54B).

7 Claims, 5 Drawing Sheets

VEHICLE LAMP

CROSS REFERENCE TO RELATED APPLICATIONS

This application is a National Stage of International Application No. PCT/JP2019/004334, filed Feb. 7, 2019, claiming priority to Japanese Patent Application No. 2018-024093, filed Feb. 14, 2018.

TECHNICAL FIELD

The present invention relates to a vehicle lamp, and more particularly to a vehicle lamp capable of suppressing feeling of flicker of light while being downsized.

BACKGROUND ART

A vehicle headlamp represented by an automobile headlight is configured to at least apply low beam for illuminating the front at night. In order to form this low beam light distribution pattern, a shade that shields some of pieces of light emitted from a light source is used. However, with the diversification of vehicle designs, there is a demand for downsizing of vehicle headlamps.

Patent Literature 1 below discloses a vehicle headlamp that can form a low beam light distribution pattern without using a shade. The vehicle headlamp includes a hologram element and a light source that irradiates the hologram element with reference light. The hologram element is calculated such that diffracted light reproduced by irradiation with the reference light forms a low beam light distribution pattern. Since this vehicle headlamp forms the low beam light distribution pattern by the hologram element in this way, this vehicle headlamp does not require a shade and can be downsized.

[Patent Literature 1] JP 2012-146621 A

SUMMARY OF INVENTION

As the light incident on the hologram element of the vehicle headlamp of above-described Patent Literature 1, for example, laser light is mentioned. However, there is a concern that, when the laser light is applied to the subject, pieces of light scattered on an applied surface interfere with each other due to the effect of minute irregularities on the applied surface, resulting in speckle which is a fine speckled pattern that causes flicker of light.

Therefore, it is an object of the present invention to provide a vehicle lamp capable of suppressing feeling of flicker of light while being downsized.

To achieve the above-described object, a vehicle lamp of the present invention includes: a light source that emits light having a predetermined wavelength; a light distribution pattern forming optical system that includes an optical element that changes a traveling direction of at least some of pieces of the light emitted from the light source, and emits light of a predetermined light distribution pattern; and a vibration imparting unit that relatively vibrates the light source and the optical element.

This vehicle lamp can emit light of a predetermined light distribution pattern without using a shade as similar to the vehicle headlamp disclosed in Patent Literature 1 described above, and therefore, as similar to the vehicle headlamp of the above-described Patent Literature 1, this vehicle lamp can be downsized as compared to the vehicle lamp using a shade. In this vehicle lamp, the light source and the optical element are relatively vibrated by the vibration imparting unit, so that an optical path from the light source to the emission from the light distribution pattern forming optical system changes in synchronization with the vibration. When the optical path changes in this way, an entrance angle and a phase of the light that is incident on an irradiation target object from the vehicle lamp may change even at the same position on the irradiation target object. As the change of the entrance angle and the phase of the light occurs continuously, visually continuous overlapping of pieces of light occurs, so that it is possible to suppress feeling of flicker of light.

Furthermore, it is preferable that the vibration imparting unit vibrates the optical element.

Optical elements that change the traveling direction of at least some of pieces of light generally do not require electric power. Therefore, even if the optical element vibrates, the occurrence of damage such as disconnection can be suppressed more than when the light source vibrates. Therefore, it is possible to prevent the reliability from decreasing.

In this case, the optical element is preferably a diffraction grating.

Examples of the optical element that changes the traveling direction of at least some of pieces of light include a diffraction grating and a lens. When the diffraction grating vibrates, it is possible to prevent the light distribution pattern from changing due to the vibration.

Furthermore, it is preferable that the vibration imparting unit imparts vibration to the optical element in two or more directions.

In this case, as compared to the case where the optical element vibrates only in one direction, visual continuous overlapping of light occurs in multiple directions, and it is possible to further suppress feeling of flicker of light.

Furthermore, the vibration imparting unit may vibrate the light source.

Furthermore, the vibration imparting unit may be a vibrator.

Furthermore, it is preferable that the frequency of the vibration imparted by vibration imparting unit is 15 Hz or higher.

The time resolution of human vision is approximately 30 Hz. In the case of a vehicle lamp, it is possible to suppress feeling of flicker of light when the frequency of vibration is about half of this frequency. Note that when the frequency of vibration imparted by the vibration imparting unit is 30 Hz or higher, the time resolution of human vision is generally exceeded. Therefore, it is possible to further suppress feeling of flicker of light. Moreover, if this frequency is 60 Hz or higher, it is preferable from the viewpoint that feeling of the flicker of light can be further suppressed.

Furthermore, a base on which the light source and the optical element are arranged may be further provided, the vibration imparting unit may be an elastic body, and the light source or the optical element may be arranged on the base via the elastic body.

The component arranged via the elastic body vibrates relatively to the component arranged without the elastic body due to vibration of the engine or vibration of traveling of the vehicle. Therefore, one of the light source and the optical element arranged via the elastic body vibrates relatively to the other of the light source and the optical element arranged without the elastic body. Therefore, the elastic body serves as a vibration imparting unit. Thus, even when an elastic body is used as the vibration imparting unit, it is possible to suppress feeling of flicker of light.

As described above, according to the vehicle lamp of the present invention, it is possible to achieve a vehicle lamp capable of suppressing flicker of light while being downsized.

DESCRIPTION OF EMBODIMENTS

Hereinafter, embodiments for implementing a vehicle lamp according to the present invention will be exemplified with reference to the accompanying drawings. The embodiments exemplified below are for the purpose of facilitating the understanding of the present invention, and are not intended to limit the present invention. The present invention can be modified and improved from the following embodiments without departing from the gist thereof.

First Embodiment

Figure 1:
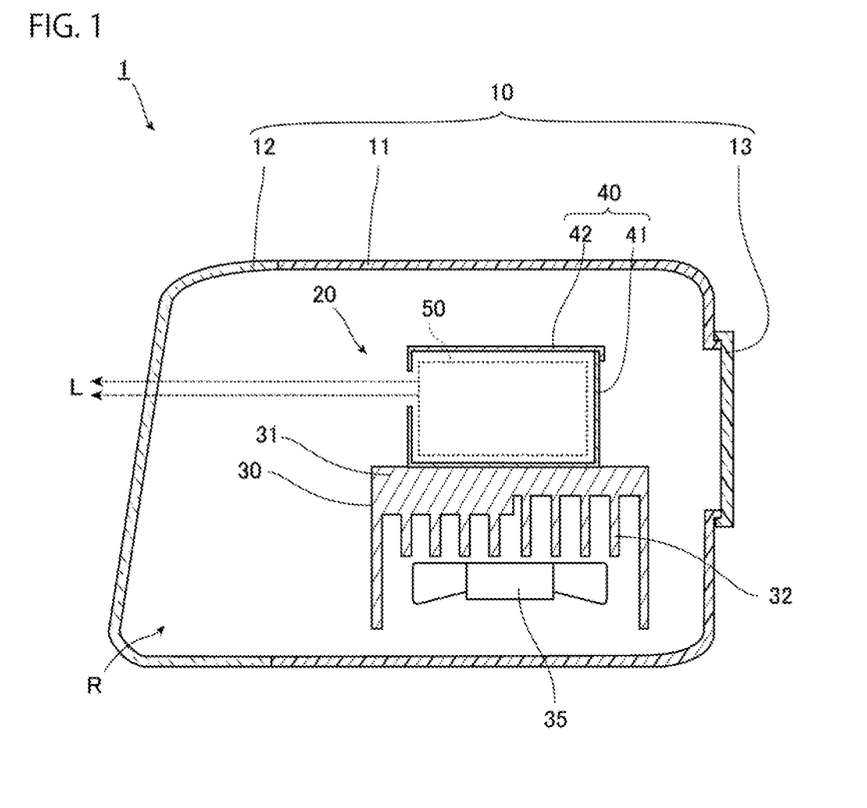
FIG. 1 is a diagram showing an example of a vehicle lamp according to a first embodiment of the present invention.

FIG. 1 is a diagram showing an example of a vehicle lamp according to the present embodiment, and is a diagram schematically showing a vertical cross section of the vehicle lamp. In the present embodiment, a vehicle lamp is a vehicle headlamp 1, and as shown in FIG. 1, the vehicle headlamp 1 of the present embodiment includes a housing 10 and a lamp unit 20 as main components.

The housing 10 includes a lamp housing 11, a front cover 12, and a back cover 13 as main components. The front of the lamp housing 11 is open, and the front cover 12 is fixed to the lamp housing 11 so as to close the opening. An opening smaller than that in the front is formed in the rear of the lamp housing 11, and the back cover 13 is fixed to the lamp housing 11 so as to close the opening.

A space formed by the lamp housing 11, the front cover 12 closing the front opening of the lamp housing 11, and a back cover 13 closing the rear opening of the lamp housing 11 is a lamp room R. The lamp unit 20 is housed in the lamp room R.

The lamp unit 20 of the present embodiment includes a heat sink 30, a cooling fan 35, a case 40, and an optical system unit 50 as main components. Note that the lamp unit 20 is fixed to the housing 10 by a configuration (not shown).

In the present embodiment, the heat sink 30 has a metal base plate 31 extending in a generally horizontal direction, and a plurality of heat radiation fins 32 are provided integrally with the base plate 31 on the lower surface side of the base plate 31. The cooling fan 35 is arranged with a gap from the heat radiation fin 32 and is fixed to the heat sink 30. The heat sink 30 is cooled by the air flow generated by the rotation of the cooling fan 35. The case 40 is arranged on the upper surface of the base plate 31 of the heat sink 30.

For example, the case 40 of the present embodiment includes a base 41 and a cover 42 made of metal such as aluminum, and the base 41 is fixed to the upper surface of the base plate 31 of the heat sink 30. The base 41 is formed in a box shape with an opening formed from the front portion to the upper portion, a cover 42 is fixed to the base 41 so as to close the opening on the upper portion side, and an opening 40H defined by the front end portion of the base 41 and the front end portion of the cover 42 is formed in the front portion of the case 40. The optical system unit 50 is arranged in the space inside the case 40. Note that the inner walls of the base 41 and the cover 42 are preferably made light-absorbing by black alumite processing or the like. By making the inner walls of the base 41 and the cover 42 light-absorbing, it is possible to prevent light applied to the inner wall of the base 41 due to unintended reflection or refraction from reflecting and being emitted from the opening 40H in an unintended direction.

Figure 2:
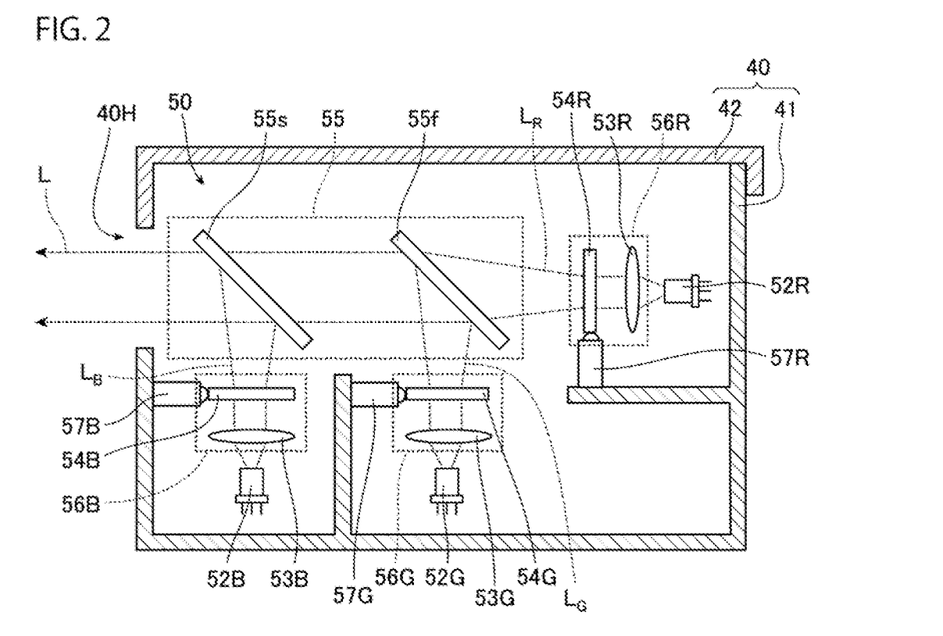
FIG. 2 is an enlarged view of an optical system unit of FIG. 1.

FIG. 2 is an enlarged view of the optical system unit 50 of the vehicle headlamp 1 shown in FIG. 1. As shown in FIG. 2, in the present embodiment, the optical system unit 50 includes a first light source 52R, a second light source 52G, a third light source 52B, a first light distribution pattern forming optical system 56R, a second light distribution pattern forming optical system 56G, a third light distribution pattern forming optical system 56B, a first vibration imparting unit 57R, a second vibration imparting unit 57G, a third vibration imparting unit 57B, and a synthesizing optical system 55. Note that, in FIG. 2, description of the heat sink 30 is omitted for easy understanding.

The first light source 52R is a laser element that emits laser light having a predetermined wavelength, and, in the present embodiment, emits red laser light having a power peak wavelength of 638 nm, for example. The second light source 52G and the third light source 52B are laser elements that emit laser light having predetermined wavelengths, and in the present embodiment, the second light source 52G emits green laser light having a power peak wavelength of 515 nm, for example, and, the third light source 52B emits blue laser light having a power peak wavelength of 445 nm, for example. The optical system unit 50 has a circuit board (not shown) fixed to the base 41, and the first light source 52R, the second light source 52G, and the third light source 52B are mounted on the circuit board, and power is supplied to the first light source 52R, the second light source 52G, and the third light source 52B through the circuit board.

In the present embodiment, the first light distribution pattern forming optical system 56R includes a collimator lens 53R and a diffraction grating 54R. The collimator lens 53R is an optical element that changes the traveling direction of at least some of pieces of laser light emitted from the first light source 52R, and is a lens that collimates the fast axis direction and the slow axis direction of the laser light emitted from the first light source 52R. The collimator lens 53R is fixed to the base 41 by a configuration not shown. Note that, instead of the collimator lens 53R, a collimator lens that collimates the fast axis direction of the laser light and a collimator lens that collimates the slow axis direction of the laser light may be separately provided.

The diffraction grating 54R is an optical element that changes the traveling direction of at least some of pieces of laser light emitted from the collimator lens 53R, and is a transmission type diffraction grating in the present embodiment. The diffraction grating 54R is supported by the base 41 so that the diffraction grating 54R can vibrate in a direction generally perpendicular to the traveling direction of the laser light emitted from the first light source 52R by a configuration not shown. The diffraction grating 54R diffracts the laser light emitted from the collimator lens 53R into a predetermined light distribution pattern. The diffraction grating 54R has a diffraction grating pattern in each of the divided regions, and each diffraction grating pattern diffracts the laser light emitted from the collimator lens 53R so as to have a predetermined light distribution pattern. That is, the diffraction grating 54R is a set of a plurality of diffraction gratings having the same diffraction grating pattern. Note that this diffraction grating pattern is formed so as to be located at least one or more in the region where the laser light emitted from the collimator lens 53R is incident.

The diffraction grating 54R of the present embodiment diffracts the laser light incident from the collimator lens 53R so that the light emitted from each of the first light distribution pattern forming optical system 56R, the second light distribution pattern forming optical system 56G, and the third light distribution pattern forming optical system 56B has a light distribution pattern of the low beam L, in the synthesizing optical system 55 described later. The intensity distribution is also included in the light distribution patterns. Therefore, in the present embodiment, the laser light emitted from the diffraction grating 54R has an intensity distribution based on the intensity distribution of the light distribution pattern of the low beam L while overlapping with the light distribution pattern of the low beam L. Note that it is preferable that the diffraction grating 54R diffracts the laser light incident from the collimator lens 53R so that the outer shape of the light distribution pattern of the laser light emitted from the diffraction grating 54R matches the outer shape of the light distribution pattern of the low beam L. Thus, the red component light of the light distribution pattern of the low beam L is emitted from the first light distribution pattern forming optical system 56R. In the present embodiment, the red component light emitted from the first light distribution pattern forming optical system 56R is first light $L_R$.

In the present embodiment, the second light distribution pattern forming optical system 56G includes a collimator lens 53G and a diffraction grating 54G, and the third light distribution pattern forming optical system 56B includes a collimator lens 53B and a diffraction grating 54B.

The collimator lens 53G is an optical element that changes the traveling direction of at least some of pieces of laser light emitted from the second light source 52G, and is a lens that collimates the fast axis direction and the slow axis direction of the laser light emitted from the second light source 52G. The collimator lens 53B is an optical element that changes the traveling direction of at least some of pieces of laser light emitted from the second light source 52G, and is a lens that collimates the fast axis direction and the slow axis direction of the laser light emitted from the third light source 52B. These collimator lenses 53G, 53B are fixed to the base 41 by a configuration not shown. Note that, instead of these collimator lenses 53G, 53B, and as similar to the collimator lens 53R, a collimator lens that collimates the fast axis direction of the laser light and a collimator lens that collimates the slow axis direction of the laser light may be separately provided.

The diffraction grating 54G is an optical element that changes the traveling direction of at least some of pieces of laser light emitted from the collimator lens 53G, and is a transmission type diffraction grating in the present embodiment. The diffraction grating 54G is supported by the base 41 so that the diffraction grating 54G can vibrate in a direction generally perpendicular to the traveling direction of the laser light emitted from the second light source 52G by a configuration not shown. The diffraction grating 54B is an optical element that changes the traveling direction of at least some of pieces of laser light emitted from the collimator lens 53B, and is a transmission type diffraction grating in the present embodiment. The diffraction grating 54B is supported by the base 41 so that the diffraction grating 54B can vibrate in a direction generally perpendicular to the traveling direction of the laser light emitted from the third light source 52B by a configuration not shown. These diffraction gratings 54G, 54B diffract the laser light emitted from the collimator lenses 53G, 53B into a predetermined light distribution pattern. The diffraction gratings 54G, 54B each have a diffraction grating pattern in each of the divided regions, and diffract the laser light emitted from the collimator lenses 53G, 53B so that each diffraction grating pattern has a predetermined light distribution pattern. That is, each of the diffraction gratings 54G, 54B is a set of a plurality of diffraction gratings having the same diffraction grating pattern. Note that this diffraction grating pattern is formed so as to be located at least one or more in the region where the laser light emitted from the collimator lenses 53G, 53B is incident.

The diffraction gratings 54G, 54B of the present embodiment diffract the laser light incident from the collimator lenses 53G, 53B so that the light emitted from each of the first light distribution pattern forming optical system 56R, the second light distribution pattern forming optical system 56G, and the third light distribution pattern forming optical system 56B has a light distribution pattern of the low beam L, in the synthesizing optical system 55. As described above, the intensity distribution is also included in these light distribution patterns. Therefore, in the present embodiment, the laser light emitted from the diffraction gratings 54G, 54B has an intensity distribution based on the intensity distribution of the light distribution pattern of the low beam L while overlapping with the light distribution pattern of the low beam L. Note that it is preferable that the diffraction gratings 54G, 54B diffract the laser light incident from the collimator lenses 53G, 53B so that the outer shape of the light distribution pattern of the laser light emitted from the diffraction gratings 54R, 54B matches the outer shape of the light distribution pattern of the low beam L. Thus, the green component light of the light distribution pattern of the low beam L is emitted from the second light distribution pattern forming optical system 56G, and the blue component light of the light distribution pattern of the low beam L is emitted from the third light distribution pattern forming optical system 56B. In the present embodiment, the green component light emitted from the second light distribution pattern forming optical system 56G is second light $L_G$, and the blue component light emitted from the third light distribution pattern forming optical system 56B is third light $L_B$.

Note that the intensity distribution based on the intensity distribution of the light distribution pattern of the low beam L described above means that, in the portion where the light intensity in the light distribution pattern of the low beam L is high, the intensity of each piece of light emitted from the diffraction gratings 54R, 54G, 54B is also high.

In the present embodiment, the first vibration imparting unit 57R is an electric vibrator that vibrates the diffraction grating 54R in one direction generally perpendicular to the traveling direction of the laser light emitted from the first light source 52R. The second vibration imparting unit 57G is an electric vibrator that vibrates the diffraction grating 54G in one direction generally perpendicular to the traveling direction of the laser light emitted from the second light source 52G. The third vibration imparting unit 57B is an electric vibrator that vibrates the diffraction grating 54B in one direction generally perpendicular to the traveling direction of the laser light emitted from the third light source 52B. Each of the first vibration imparting unit 57R, the second vibration imparting unit 57G, and the third vibration imparting unit 57B is fixed to the base 41. As described above, the circuit board on which the first light source 52R, the second light source 52G, and the third light source 52B are mounted is fixed to the base 41. Therefore, the first vibration imparting unit 57R vibrates the diffraction grating 54R relatively to the first light source 52R, and the second vibration imparting unit 57G vibrates the diffraction grating 54G relatively to the second light source 52G, and the third vibration imparting unit 57B vibrates the diffraction grating 54G relative to the third light source 52B. The diffraction grating 54R is arranged on the base 41 via the first vibration imparting unit 57R, the diffraction grating 54G is arranged on the base 41 via the second vibration imparting unit 57G, and the diffraction grating 54B is arranged on the base 41 via the third vibration imparting unit 57B.

The synthesizing optical system 55 has a first optical element 55$f$ and a second optical element 55$s$. The first optical element 55$f$ is an optical element that synthesizes the first light $L_R$ emitted from the first light distribution pattern forming optical system 56R and the second light $L_G$ emitted from the second light distribution pattern forming optical system 56G. In the present embodiment, the first optical element 55$f$ transmits the first light $L_R$ and reflects the second light $L_G$ to synthesize the first light $L_R$ and the second light $L_G$. The second optical element 55$s$ is an optical element that synthesizes the first light $L_R$ and the second light $L_G$ synthesized by the first optical element 55$f$, and the third light $L_B$ emitted from the third light distribution pattern forming optical system 56B. In the present embodiment, the second optical element 55$s$ transmits the first light $L_R$ and the second light $L_G$ synthesized by the first optical element 55$f$ and reflects the third light $L_B$ to synthesize the first light $L_R$, the second light $L_G$, and the third light $L_B$. Examples of the first optical element 55$f$ and the second optical element 55$s$ include an optical filter in which an oxide film is laminated on a glass substrate. By controlling the type and thickness of this oxide film, a configuration can be achieved in which light having a wavelength longer than a predetermined wavelength is transmitted and light having a wavelength shorter than this wavelength is reflected.

In this way, the synthesizing optical system 55 emits the light obtained by synthesizing the first light $L_R$, the second light $L_G$, and the third light $L_B$.

Next, the emission of light by the vehicle headlamp 1 will be described.

First, when power is supplied from a power source (not shown), laser light is emitted from each of the first light source 52R, the second light source 52G, and the third light source 52B. Furthermore, the first vibration imparting unit 57R vibrates the diffraction grating 54R with respect to the first light source 52R, the second vibration imparting unit 57G vibrates the diffraction grating 54G with respect to the second light source 52G, and the third vibration imparting unit 57B vibrates the diffraction grating 54B with respect to the third light source 52B. As described above, the red laser light is emitted from the first light source 52R, the green laser light is emitted from the second light source 52G, and the blue laser light is emitted from the third light source 52B. The respective laser lights are collimated by the collimator lenses 53R, 53G, 53B and then enter the diffraction gratings 54R, 54G, 54B. The pieces of laser light incident on the diffraction gratings 54R, 54G, 54B are diffracted by the diffraction gratings 54R, 54G, 54B, respectively, as described above, and the diffraction grating 54R emits the first light $L_R$ which is the red component light of the light distribution pattern of the low beam L, the diffraction grating 54G emits the second light $L_G$ which is the green component light of the light distribution pattern of the low beam L, and the diffraction grating 54B emits the third light $L_B$ of the blue component light of the light distribution pattern of the low beam L. Thus, the first light distribution pattern forming optical system 56R emits the first light $L_R$, the second light distribution pattern forming optical system 56G emits the second light $L_G$, and the third light distribution pattern forming optical system 56B emits the third light $L_B$.

In the synthesizing optical system 55, first, the first light $L_R$ and the second light $L_G$ are synthesized by the first optical element 55$f$ and emitted. The first light $L_R$ and the second light $L_G$ synthesized by the first optical element 55$f$ are synthesized with the third light $L_B$ by the second optical element 55$s$. Thus, the light obtained by synthesizing the red first light $L_R$, the green second light $L_G$, and the blue third light $L_B$ is white light. Furthermore, since each of the first light $L_R$, the second light $L_G$ and the third light $L_B$ overlaps with the light distribution pattern of the low beam L as described above, and has an intensity distribution based on the intensity distribution of the light distribution pattern of the low beam L, the white light obtained by synthesizing these pieces of light has the intensity distribution of the low beam L.

In this way, the white light obtained by synthesizing is emitted from the opening 40H of the case 40, and this light is emitted from the vehicle headlamp 1 through the front cover 12. Since this light has a light distribution pattern of the low beam L, the irradiation light is the low beam L.

By the way, since the first vibration imparting unit 57R vibrates the diffraction grating 54R with respect to the first light source 52R as described above, in the optical path from the first light source 52R to the emission from the first light distribution pattern forming optical system 56R, the portion that transmits the diffraction grating 54R changes in synchronization with the vibration. Since the second vibration imparting unit 57G vibrates the diffraction grating 54G with respect to the second light source 52G, in the optical path from the second light source 52G to the emission from the second light distribution pattern forming optical system 56G, the portion that transmits the diffraction grating 54G changes in synchronization with the vibration. Since the third vibration imparting unit 57B vibrates the diffraction grating 54B with respect to the third light source 52B, in the optical path from the third light source 52B to the emission from the third light distribution pattern forming optical system 56B, the portion that transmits the diffraction grating 54B changes in synchronization with the vibration. When the optical path is changed in this way, the entrance angles and the phases of the first light $L_R$, the second light $L_G$, and the third light $L_B$ that form the low beam L incident from the vehicle headlamp 1 onto the irradiation target object can change in synchronization with the vibration, even at the same position on the irradiation target object such as the road surface. As the change of the entrance angle and the phase of the light continuously occurs, visually continuous overlapping of the first light $L_R$, the second light $L_G$, and the third light $L_B$ occurs. Therefore, it is possible to prevent the speckles from being conspicuous due to a change with time in the interference of each of the first light $L_R$, the second light $L_G$, and the third light $L_B$ scattered on the applied surface of the irradiation target object. Therefore, it is possible to suppress feeling of flicker of each of the first light $L_R$, the second light $L_G$, and the third light $L_B$. Thus, it is possible to suppress feeling of flicker of the low beam L formed by the first light $L_R$, the second light $L_G$, and the third light $L_B$.

Note that the frequency of vibration imparted to the diffraction gratings 54R, 54G, 54B by the first vibration imparting unit 57R, the second vibration imparting unit 57G, and the third vibration imparting unit 57B is preferably 15 Hz or higher from the viewpoint of preventing feeling of flicker of light. The time resolution of human vision is approximately 30 Hz. In the case of a vehicle lamp, it is possible to suppress feeling of flicker of light when the frequency of vibration is about half of this frequency. Note that when the frequency of vibration imparted by the vibration imparting units is 30 Hz or higher, the time resolution of human vision is generally exceeded. Therefore, it is possible to further suppress feeling of flicker of light. Moreover, if this frequency is 60 Hz or higher, it is preferable from the viewpoint that feeling of the flicker of light can be further suppressed. Note that the frequencies of vibration imparted to the diffraction gratings 54R, 54G, 54B by the first vibration imparting unit 57R, the second vibration imparting unit 57G, and the third vibration imparting unit 57B may be different from each other or may be the same.

Furthermore, the amplitude of vibration applied to the diffraction gratings 54R, 54G, 54B by the first vibration imparting unit 57R, the second vibration imparting unit 57G, and the third vibration imparting unit 57B is, for example, larger than the length of the vibration direction of the region having the diffraction grating pattern in the diffraction gratings 54R, 54G, 54B, and is in an extent that the pieces of laser light emitted from the first light source 52R, the second light source 52G, the third light source 52B do not protrude from the diffraction gratings 54R, 54G, 54B, that is, smaller than the length of the set of the plurality of diffraction grating patterns in the vibration direction. Although this amplitude may be generally constant, it is preferable that the amplitude varies from the viewpoint of suppressing flicker of light. By variation of the amplitude, as compared to the case where the amplitude does not vary, visually continuous overlapping of the first light $L_R$, the second light $L_G$, and the third light $L_B$ occurs in multiple directions, and it is possible to further suppress feeling of flicker of the first light $L_R$, the second light $L_G$, and the third light $L_B$. Note that the amplitudes of vibration imparted to the diffraction gratings 54R, 54G, 54B by the first vibration imparting unit 57R, the second vibration imparting unit 57G, and the third vibration imparting unit 57B may be different from each other or may be the same.

Figure 3A:
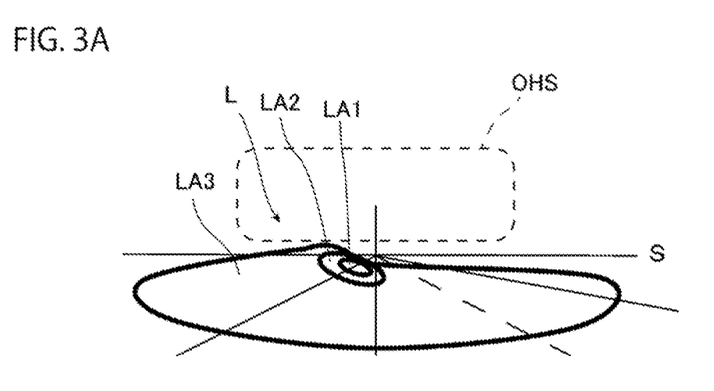
FIG. 3A and FIG. 3B are diagrams showing light distribution patterns.
Figure 3B:
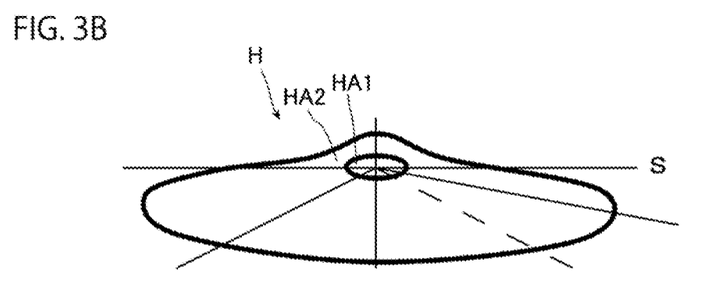

FIG. 3A and FIG. 3B are diagrams showing light distribution patterns for night illumination, specifically, FIG. 3A is a diagram showing a low beam light distribution pattern, and FIG. 3B is a diagram showing a high beam light distribution pattern. In FIG. 3A and FIG. 3B, S indicates a horizontal line, and the light distribution pattern is indicated by a thick line. In the light distribution pattern of the low beam L which is the light distribution pattern for night illumination shown in FIG. 3A, a region LA1 is the region having the highest intensity, and regions LA2 and LA3 have lower intensities in this order. That is, each of the diffraction gratings 54R, 54G, 54B diffracts the light so that the light obtained by synthesizing forms a light distribution pattern including the intensity distribution of the low beam L. Note that, as shown by the broken line in FIG. 3A, light having a lower intensity than the low beam L may be applied from the vehicle headlamp 1 to a portion above the position where the low beam L is applied. This light is used as sign visual recognition light OHS. In this case, it is preferable that the diffracted light emitted from each of the diffraction gratings 54R, 54G, 54B includes the sign visual recognition light OHS. In this case, it can be understood that the low beam L and the sign visual recognition light OHS form a light distribution pattern for night illumination. Note that the light distribution pattern for night illumination is not used only at night, but is also used in a dark place such as a tunnel.

As described above, the vehicle headlamp 1 according to the present embodiment includes: the first light source 52R, the second light source 52G, and the third light source 52B that each emit light having a predetermined wavelength; the first light distribution pattern forming optical system 56R including the collimator lens 53R and the diffraction grating 54R; the second light distribution pattern forming optical system 56G including the collimator lens 53G and the diffraction grating 54G; the third light distribution pattern forming optical system 56B including the collimator lens 53B and the diffraction grating 54B; the first vibration imparting unit 57R; the second vibration imparting unit 57G; and the third vibration imparting unit 57B. The collimator lens 53R and the diffraction grating 54R are optical elements that change the traveling direction of at least some of pieces of light emitted from the first light source 52R, the collimator lens 53G and the diffraction grating 54G are optical elements that change the traveling direction of at least some of pieces of light emitted from the second light source 52G, and the collimator lens 53B and the diffraction grating 54B are optical elements that change the traveling direction of at least some of pieces of light emitted from the third light source 52B. The first light distribution pattern forming optical system 56R emits the first light $L_R$ of the red component of the light distribution pattern of the low beam L, the second light distribution pattern forming optical system 56G emits the second light $L_G$ of the green component of the light distribution pattern of the low beam L, and the third light distribution pattern forming optical system 56B emits the third light $L_B$ of the blue component of the light distribution pattern of the low beam L. That is, each of the first light distribution pattern forming optical system 56R, the second light distribution pattern forming optical system 56G, and the third light distribution pattern forming optical system 56B emits light of a predetermined light distribution pattern. The first vibration imparting unit 57R vibrates the diffraction grating 54R with respect to the first light source 52R, and the second vibration imparting unit 57G vibrates the diffraction grating 54G with respect to the second light source 52G, and the third vibration imparting unit 57B vibrates the diffraction grating 54B with respect to the third light source 52B.

Therefore, the vehicle headlamp 1 of the present embodiment can form the light distribution pattern of the low beam L without using a shade, and thus can be downsized as compared to a vehicle headlamp that uses a shade. When the first vibration imparting unit 57R vibrates the diffraction grating 54R with respect to the first light source 52R, the optical path from the first light source 52R to the emission from the first light distribution pattern forming optical system 56R changes in synchronization with the vibration. When the second vibration imparting unit 57G vibrates the diffraction grating 54G with respect to the second light source 52G, the optical path from the second light source 52G to the emission from the second light distribution pattern forming optical system 56G changes in synchronization with the vibration. When the third vibration imparting unit 57B vibrates the diffraction grating 54B with respect to the third light source 52B, the optical path from the third light source 52B to the emission from the third light distribution pattern forming optical system 56B changes in synchronization with the vibration. As described above, when the optical path is changed in this way, the entrance angles and the phases of the first light $L_R$, the second light $L_G$, and the third light $L_B$ that form the low beam L incident from the vehicle headlamp 1 onto the irradiation target object can change, even at the same position on the irradiation target object such as a road surface. When the change of the entrance angle and the phase of the light occurs continuously, visually continuous overlapping of the first light $L_R$, the second light $L_G$, and the third light $L_B$ occurs, and it is possible to suppress feeling of flicker of the low beam L formed by the first light $L_R$, the second light $L_G$, and the third light $L_B$.

Furthermore, in the present embodiment, three light sources 52R, 52G, 52B that emit light having different wavelengths, and three light distribution pattern forming optical systems 56R, 56G, 56B respectively corresponding to the three light sources 52R, 52G, 52B, are provided, so that light of a desired color can be emitted by adjusting the intensity of light emitted from each of the light sources 52R, 52G, 52B.

Second Embodiment

Next, a second embodiment of the present invention will be described in detail with reference to FIG. 4. Note that the same or equivalent constituent elements as those of the first embodiment are denoted by the same reference numerals, and redundant explanation will be omitted except when particularly described.

Figure 4:
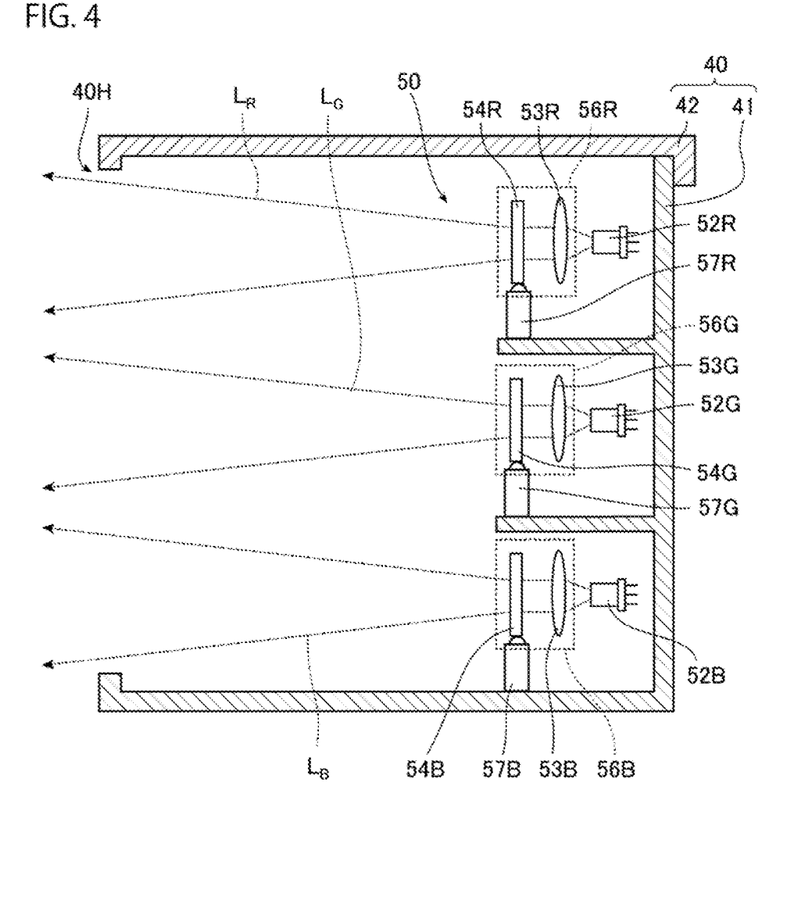
FIG. 4 is a diagram showing an optical system unit of a vehicle headlamp according to a second embodiment of the present invention, as similar to FIG. 2.

FIG. 4 is a diagram showing an optical system unit of a vehicle headlamp according to the present embodiment, as similar to FIG. 2. As shown in FIG. 4, the optical system unit 50 of the vehicle headlamp of the present embodiment is different from the optical system unit 50 of the first embodiment in points that the synthesizing optical system 55 is not provided, and light is emitted from the case 40 in a state where pieces of light emitted from the first light distribution pattern forming optical system 56R, the second light distribution pattern forming optical system 56G, and the third light distribution pattern forming optical system 56B are not synthesized. In the present embodiment, the first light distribution pattern forming optical system 56R, the second light distribution pattern forming optical system 56G, and the third light distribution pattern forming optical system 56B are such that the light emission direction is the opening 40H side of the case 40. Note that, in FIG. 4, description of the heat sink 30 is omitted for easy understanding.

Also in the present embodiment, as similar to the first embodiment, each of the diffraction grating 54R of the first light distribution pattern forming optical system 56R, the diffraction grating 54G of the second light distribution pattern forming optical system 56G, and the diffraction grating 54B of the third light distribution pattern forming optical system 56B diffracts light so that the emitted light overlaps the light distribution pattern of the low beam L and has an intensity distribution based on the intensity distribution of the low beam light distribution pattern. Each of the first light $L_R$ emitted from the diffraction grating 54R, the second light $L_G$ emitted from the diffraction grating 54G, and the third light $L_B$ emitted from the diffraction grating 54B is emitted from the opening 40H of the case 40, and is applied to the outside of the vehicle headlamp through the front cover 12. At this time, the first light $L_R$, the second light $L_G$, and the third light $L_B$ are applied so that regions irradiated with the respective pieces of light overlap with each other at the focal position separated by a predetermined distance from the vehicle. The focal position is, for example, 25 m away from the vehicle.

Note that, also in the present embodiment, the first vibration imparting unit 57R vibrates the diffraction grating 54R in one direction generally perpendicular to the traveling direction of the laser light emitted from the first light source 52R. The second vibration imparting unit 57G vibrates the diffraction grating 54G in one direction generally perpendicular to the traveling direction of the laser light emitted from the second light source 52G. The third vibration imparting unit 57B vibrates the diffraction grating 54B in one direction generally perpendicular to the traveling direction of the laser light emitted from the third light source 52B.

According to the vehicle headlamp of the present embodiment, since the synthesizing optical system 55 of the first embodiment is not used, it is possible to achieve a simple configuration and suppress flicker of light.

Third Embodiment

Next, a third embodiment of the present invention will be described in detail with reference to FIG. 5. Note that the same or equivalent constituent elements as those of the first embodiment are denoted by the same reference numerals, and redundant explanation will be omitted except when particularly described.

Figure 5:
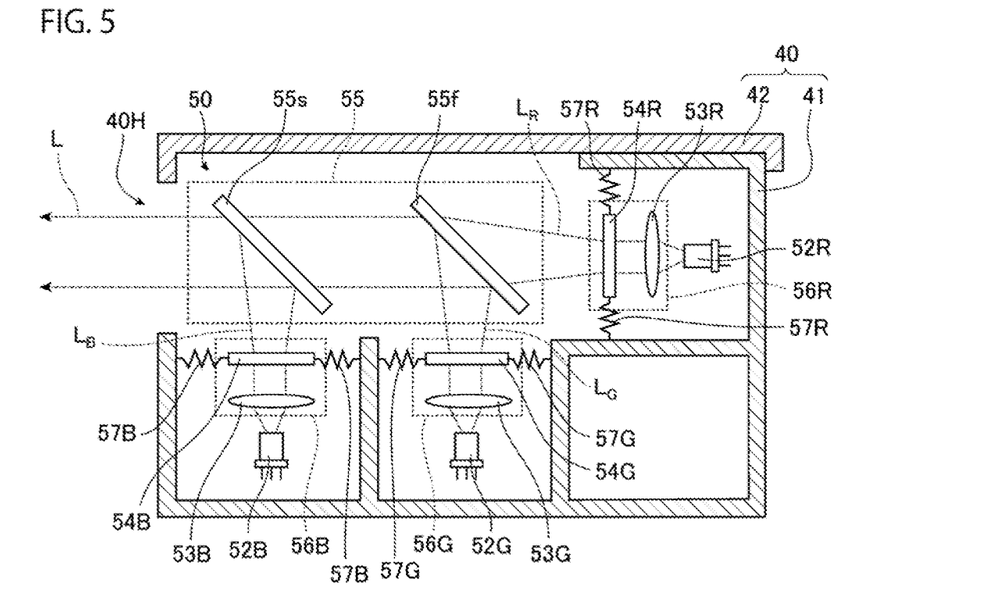
FIG. 5 is a diagram showing an optical system unit of a vehicle headlamp according to a third embodiment of the present invention, as similar to FIG. 2.

FIG. 5 is a diagram showing an optical system unit of a vehicle headlamp according to the present embodiment, as similar to FIG. 2. As shown in FIG. 5, the optical system unit 50 of the vehicle headlamp of the present embodiment is different from the lamp unit 20 of the first embodiment in a point that the first vibration imparting unit 57R, the second vibration imparting unit 57G, and the third vibration imparting unit 57B are not electric vibrators, and are elastic bodies. Note that, in FIG. 5, description of the heat sink 30 is omitted for easy understanding.

In the present embodiment, the diffraction grating 54R is arranged on the base 41 via the first vibration imparting unit 57R which is an elastic body, the diffraction grating 54G is arranged on the base 41 via the second vibration imparting unit 57G which is an elastic body, and the diffraction grating 54B is arranged on the base 41 via the third vibration imparting unit 57B which is an elastic body. As the elastic body, for example, a member made of a spring, rubber or the like can be used.

The diffraction grating 54R arranged on the base 41 via the first vibration imparting unit 57R which is an elastic body, the diffraction grating 54G arranged on the base 41 via the second vibration imparting unit 57G which is an elastic body, and the diffraction grating 54B arranged on the base 41 via the third vibration imparting unit 57B which is an elastic body vibrate relative to the components arranged without the elastic body due to vibration of the engine or vibration of traveling of the vehicle. As described above, the circuit board on which the first light source 52R, the second light source 52G, and the third light source 52B are mounted is fixed to the base 41. Therefore, the first vibration imparting unit 57R can vibrate the diffraction grating 54R relative to the first light source 52R. The second vibration imparting unit 57G can vibrate the diffraction grating 54G relative to the second light source 52G. The third vibration imparting unit 57B can vibrate the diffraction grating 54B relative to the third light source 52B. Thus, even in the present embodiment in which the elastic body is used as the vibration imparting unit, the optical path from the light sources 52R, 52G, 52B to the emission from the light distribution pattern forming optical systems 56R, 56G, 56B changes in synchronization with the vibration of the diffraction gratings 54R, 54G, 54B, so that flicker of light can be suppressed.

Fourth Embodiment

Next, a fourth embodiment of the present invention will be described in detail with reference to FIG. 6. Note that the same or equivalent constituent elements as those of the first embodiment are denoted by the same reference numerals, and redundant explanation will be omitted except when particularly described.

Figure 6:
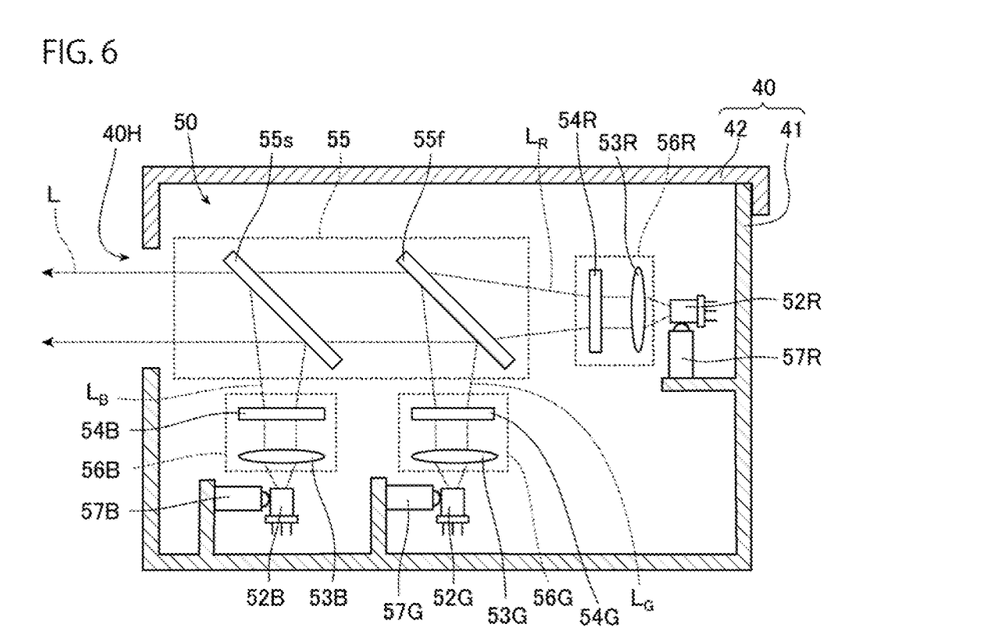
FIG. 6 is a diagram showing an optical system unit of a vehicle headlamp according to a fourth embodiment of the present invention, as similar to FIG. 2.

FIG. 6 is a diagram showing an optical system unit of a vehicle headlamp according to the present embodiment, as similar to FIG. 2. As shown in FIG. 6, the optical system unit 50 of the vehicle headlamp of the present embodiment is different from the lamp unit 20 of the first embodiment in points that the first vibration imparting unit 57R vibrates the first light source 52R, the second vibration imparting unit 57G vibrates the second light source 52G, and the third vibration imparting unit 57B vibrates the third light source 52B, and each of the diffraction gratings 54R, 54G, 54B is fixed to the base 41 by a configuration not shown. Note that, in FIG. 6, description of the heat sink 30 is omitted for easy understanding.

The first light source 52R of the present embodiment is mounted on the above-mentioned circuit board so that the first light source 52R can vibrate in a direction generally perpendicular to the traveling direction of the laser light emitted from the first light source 52R. The second light source 52G is mounted on the above-mentioned circuit board so that the second light source 52G can vibrate in a direction generally perpendicular to the traveling direction of the laser light emitted from the second light source 52G. The third light source 52B is mounted on the above-mentioned circuit board so that the third light source 52B can vibrate in a direction generally perpendicular to the traveling direction of the laser light emitted from the third light source 52B. An example of such a configuration is a configuration in which the respective terminals of the first light source 52R, the second light source 52G, and the third light source 52B are connected to the circuit board via a terminal having elasticity. In such a case, it is preferable that these light sources 52R, 52G, 52B vibrate in a direction perpendicular to the extending direction of the terminals of the light sources 52R, 52G, 52B, respectively, and the terminals of the light sources 52R, 52G, 52B and the terminal having elasticity are joined to each other by welding or the like.

In the present embodiment, the first vibration imparting unit 57R vibrates the first light source 52R relatively in the direction generally perpendicular to the traveling direction of the laser light emitted from the first light source 52R with respect to the collimator lens 53R and the diffraction grating 54R of the first light distribution pattern forming optical system 56R. The second vibration imparting unit 57G vibrates the second light source 52G relatively in the direction generally perpendicular to the traveling direction of the laser light emitted from the second light source 52G with respect to the collimator lens 53G and the diffraction grating 54G of the second light distribution pattern forming optical system 56G. The third vibration imparting unit 57B vibrates the third light source 52B relatively in the direction generally perpendicular to the traveling direction of the laser light emitted from the third light source 52B with respect to the collimator lens 53B and the diffraction grating 54B of the third light distribution pattern forming optical system 56B.

Therefore, the entire optical path from the first light source 52R to the emission from the first light distribution pattern forming optical system 56R changes in synchronization with the vibration. The entire optical path from the second light source 52G to the emission from the second light distribution pattern forming optical system 56G changes in synchronization with the vibration. The entire optical path from the third light source 52B to the emission from the third light distribution pattern forming optical system 56B changes in synchronization with the vibration. Thus, even in the present embodiment in which the vibration imparting unit vibrates the light source with respect to the optical element of the light distribution pattern forming optical system, it is possible to suppress feeling of flicker of light.

Although the present invention has been described with the embodiments as an example, the present invention is not limited to these.

For example, in the above-described embodiments, the vehicle headlamp 1 serving as a vehicle lamp applies the low beam L, but the present invention is not particularly limited. For example, the vehicle lamp may apply high beam H or may apply light forming an image. When the vehicle lamp applies the high beam H, the light of the light distribution pattern of the high beam H, which is the light distribution pattern for night illumination shown in FIG. 3B, is applied. Note that, in the light distribution pattern of the high beam H shown in FIG. 3B, the region HA1 is the region having the highest intensity, and the region HA2 is the region having the lower intensity than the region HA1. That is, each of the diffraction gratings 54R, 54G, 54B diffracts the light so that the light obtained by synthesizing forms a light distribution pattern including the intensity distribution of the high beam H. Furthermore, when the vehicle lamp applies light forming an image, the direction of the light emitted by the vehicle lamp and the position where the vehicle lamp is attached to the vehicle are not particularly limited.

Furthermore, in the above-described embodiment, the optical system unit 50 has been described as an example, the optical system unit 50 including: three light sources 52R, 52G, 52B that emit light having different wavelengths; three light distribution pattern forming optical systems 56R, 56G, 56B respectively corresponding to the light sources 52R, 52G, 52B; and three vibration imparting units 57R, 57G, 57B respectively corresponding to the light distribution pattern forming optical systems 56R, 56G, 56B. However, it is sufficient that the optical system unit has at least one light source, a light distribution pattern forming optical system corresponding to the light source, and a vibration imparting unit corresponding to the light distribution pattern forming optical system.

Furthermore, in the first embodiment, the second embodiment, and the third embodiment, the vibration imparting units 57R, 57G, 57B that vibrate the diffraction gratings 54R, 54G, 54B of the light distribution pattern forming optical systems 56R, 56G, 56B have been described as an example, and in the fourth embodiment, the vibration imparting units 57R, 57G, 57B that vibrate the light sources 52R, 52G, 52B have been described as an example. However, it is sufficient that the vibration imparting unit can relatively vibrate the light source and the optical element that changes the traveling direction of at least some of pieces of light emitted from the light source of the light distribution pattern forming optical system. For example, in the first embodiment, the second embodiment, and the third embodiment, the vibration imparting units 57R, 57G, 57B may vibrate the collimator lenses 53R, 53G, 53B with respect to the light sources 52R, 52G, 52B. Note that it is preferable that the vibration imparting unit vibrates the optical element that changes the traveling direction of at least some of pieces of light emitted from the light source of the light distribution pattern forming optical system rather than the light source. Optical elements that change the traveling direction of at least some of pieces of light generally do not require electric power. Therefore, even if such an optical element vibrates, the occurrence of damage such as disconnection can be suppressed more than when the light source vibrates. Therefore, it is possible to prevent the reliability from decreasing. Furthermore, it is preferable that the vibration imparting unit vibrates the diffraction grating of such an optical element, and the vibration imparting unit can prevent the light distribution pattern emitted from the light distribution pattern forming optical system from changing due to the vibration.

In the first embodiment, the second embodiment, and the fourth embodiment, the direction of vibration imparted by the vibration imparting units 57R, 57G, 57B is one direction generally perpendicular to the traveling direction of the laser light emitted from the light sources 52R, 52G, 52B, but the direction is not particularly limited. Note that the vibration imparted by the vibration imparting unit is preferably in a direction not parallel to the traveling direction of the laser light emitted from the light source, and more preferably in two or more directions. When the vibration is in two or more directions, as compared to the case where the vibration is in one direction, visual continuous light overlapping occurs in multiple directions, and feeling of flicker of light can be further suppressed. As a configuration of the vibration imparting unit that imparts vibration in two directions, for example, a configuration including two electric vibrators that impart vibration of different directions and frequencies to the diffraction grating can be mentioned.

Furthermore, although the transmissive diffraction gratings 54R, 54G, 54B are described as an example in the above-described embodiments, the diffraction grating may be a reflection type diffraction grating. In the above-described embodiment, the light distribution pattern forming optical systems 56R, 56G, 56B having the collimator lenses 53R, 53G, 53B and the diffraction gratings 54R, 54G, 54B have been described as an example. However, it is sufficient that the light distribution pattern forming optical system includes an optical element that changes the traveling direction of at least some of pieces of light emitted from the light source, and emits light of a predetermined light distribution pattern. For example, the light distribution pattern forming optical system may not include a collimator lens, or may include another optical element such as a condenser lens or a prism together with the collimator lens and the diffraction grating. Furthermore, in the above-described embodiment, the case 40 including the box-shaped base 41 having the opening formed from the front portion to the upper portion and the cover 42 has been described as an example, but the shapes of the base 41 and the cover 42 composing the case 40 are not particularly limited. For example, the base 41 and the cover 42 may be formed of a plurality of members.

Furthermore, in the first embodiment, the first optical element 55f transmits the first light $L_R$ and reflects the second light $L_G$ to synthesize the first light $L_R$ and the second light $L_G$, and the second optical element 55s transmits the first light $L_R$ and the second light $L_G$ synthesized by the first optical element 55f and reflects the third light $L_B$ to synthesize the first light $L_R$, the second light $L_G$, and the third light $L_B$. However, for example, a configuration may be adopted in which the third light $L_B$ and the second light $L_G$ are synthesized in the first optical element 55f, and the third light $L_B$ and the second light $L_G$ synthesized by the first optical element 55f and the first light $L_R$ are synthesized in the second optical element 55s. In this case, the positions of the first light source 52R of the first embodiment, the first light distribution pattern forming optical system 56R, and the first vibration imparting unit 57R, are switched with the third light source 52B, the third light distribution pattern forming optical system 56B, and the third vibration imparting unit 57B, respectively. Furthermore, in the first embodiment, a bandpass filter that transmits light having a predetermined wavelength band and reflects light having other wavelength bands may be used for the first optical element 55f or the second optical element 55s. Furthermore, it is sufficient that the synthesizing optical system 55 overlaps pieces of light emitted from the respective light distribution pattern forming optical systems, and the synthesizing optical system 55 is not limited to the configuration of the first embodiment or the above-described configuration.

According to the present invention, there is provided a vehicle lamp capable of suppressing flicker of light while being downsized, and can be used in the field of vehicle lamps of automobiles or the like.

REFERENCE SIGNS LIST

1 . . . vehicle headlamp (vehicle lamp)
10 . . . housing
20 . . . lamp unit
40 . . . case
41 . . . base
42 . . . cover
50 . . . optical system unit
52R . . . first light source
52G . . . second light source
52B . . . third light source
53R, 53G, 53B . . . collimator lens
54R, 54G, 54B . . . diffraction grating
55 . . . synthesizing optical system
55f . . . first optical element
55s . . . second optical element
56R . . . first light distribution pattern forming optical system
56G . . . second light distribution pattern forming optical system
56B . . . third light distribution pattern forming optical system
57R . . . first vibration imparting unit
57G . . . second vibration imparting unit
57B . . . third vibration imparting unit

The invention claimed is:
1. A vehicle lamp comprising:
a light source that emits light having a predetermined wavelength;
a light distribution pattern forming optical system that includes an optical element that changes a traveling direction of at least some of pieces of the light emitted from the light source, and emits light having a predetermined light distribution pattern; and
a vibration imparting unit that relatively vibrates the light source and the optical element;
wherein the vibration imparting unit is a vibrator which vibrates the light source or the optical element, and an amplitude of vibration imparted by the vibration imparting unit varies.

2. The vehicle lamp according to claim 1,
wherein the vibration imparting unit vibrates the optical element.

3. The vehicle lamp according to claim 2,
wherein the optical element is a diffraction grating.

4. The vehicle lamp according to claim 2,
wherein the vibration imparting unit imparts vibration to the optical element in two or more directions.

5. The vehicle lamp according to claim 2,
wherein a frequency of vibration imparted by the vibration imparting unit is 15 Hz or higher.

6. The vehicle lamp according to claim 1,
wherein the vibration imparting unit vibrates the light source.

7. The vehicle lamp according to claim 1, wherein
the optical element is a set of a plurality of diffraction gratings, each of the plurality of diffraction gratings having a same diffraction grating pattern,
the vibration imparting unit vibrates the diffraction gratings, and
the amplitude of vibration imparted by the vibration imparting unit is larger than a length of a vibration direction of a region having the same diffraction grating pattern in each of the diffraction gratings.

* * * * *